(12) United States Patent
Beretta, III

(10) Patent No.: US 7,048,861 B2
(45) Date of Patent: May 23, 2006

(54) SYSTEM AND METHOD FOR IN-WELL AERATION

(75) Inventor: David Beretta, III, East Greenwich, RI (US)

(73) Assignee: AMTROL Inc., West Warwick, RI (US)

( * ) Notice: Subject to any disclaimer, the term of this patent is extended or adjusted under 35 U.S.C. 154(b) by 128 days.

(21) Appl. No.: 10/738,100

(22) Filed: Dec. 17, 2003

(65) Prior Publication Data

US 2005/0133456 A1 Jun. 23, 2005

(51) Int. Cl.
*C02F 1/74* (2006.01)

(52) U.S. Cl. .............. 210/747; 210/139; 210/170; 210/220; 210/416.3

(58) Field of Classification Search ............ 210/139, 210/170, 198.1, 220, 416.3, 739, 747, 758; 95/263, 265; 96/156, 202
See application file for complete search history.

(56) References Cited

U.S. PATENT DOCUMENTS

| | | | |
|---|---|---|---|
| 2,593,132 A * | 4/1952 | Gannon | ............ 96/151 |
| 4,543,186 A | 9/1985 | Weisenbarger et al. | |
| 4,582,610 A | 4/1986 | Baker | |
| 4,780,215 A | 10/1988 | Carlson | |
| 4,819,123 A * | 4/1989 | Hatimaki | ............ 361/23 |
| 5,015,370 A | 5/1991 | Fricano | |
| 5,080,805 A | 1/1992 | Houser | |
| 5,104,554 A * | 4/1992 | Dempsey | ............ 210/747 |
| 5,618,417 A * | 4/1997 | Spindler | ............ 210/170 |
| 5,620,593 A | 4/1997 | Stagner | |
| 6,007,274 A | 12/1999 | Suthersan | |
| 6,287,369 B1 | 9/2001 | Osmond | |

* cited by examiner

*Primary Examiner*—Matthew O. Savage
(74) *Attorney, Agent, or Firm*—Edwards Angell Palmer & Dodge LLP; Scott D. Wofsy

(57) ABSTRACT

A method of aerating a well having a well pump positioned therein is disclosed which includes the steps of positioning an air diffuser within the well above the level of the well pump, determining the recovery period for the well, and supplying air to the diffuser to aerate the well water, for the well recovery period, upon activation of the well pump to remove or otherwise release contaminants from the well water.

20 Claims, 3 Drawing Sheets

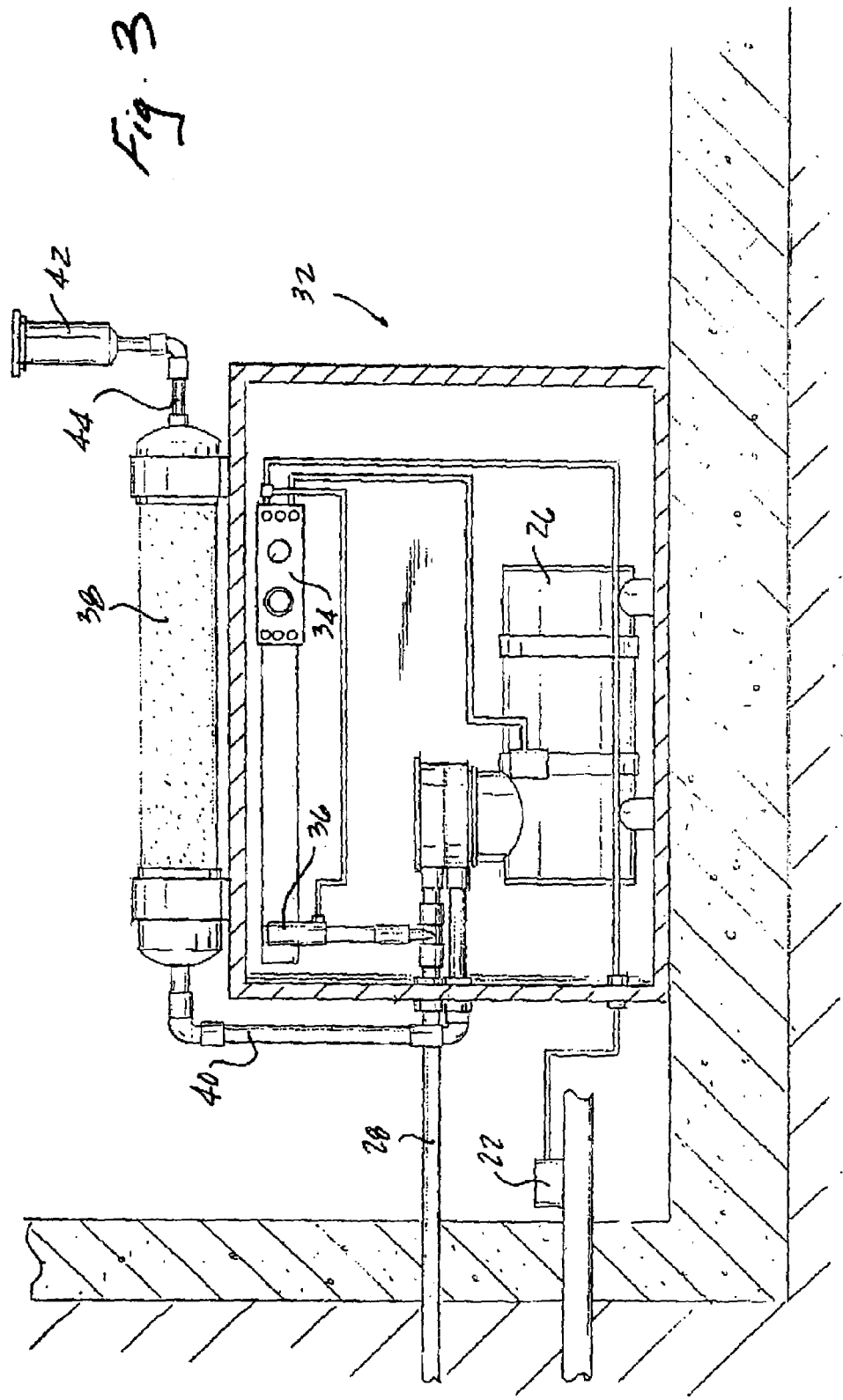

SYSTEM AND METHOD FOR IN-WELL AERATION

BACKGROUND OF THE INVENTION

1. Field of the Invention

The subject invention is directed to a system and method for aerating water within a well, and more particularly, to a system and method for aerating well water for a predetermined period of time to effectively remove contaminants from the well water.

2. Background of the Related Art

In many areas of the country, well water contains objectionable impurities such as dissolved iron, manganese or hydrogen sulfide. For example, if the water contains dissolved iron it will tend to oxidize when exposed to air, which causes the iron to precipitate out of solution. These precipitates cause rust-colored stains, which are difficult to remove from porcelain surfaces such as toilet bowls, sinks and tubs. The hydrogen sulfide is disagreeable because of its characteristic rotten egg odor.

Homeowners have typically eliminated objectionable contaminants from water using a softener and filtration system, but such units are not effective to remove moderate to high levels of dissolved iron and hydrogen sulfide. Aeration systems have also been used to oxidize dissolved solids before they enter the household plumbing. Such systems have been installed within the home in conjunction with a pressure tank and within the well itself. These aeration systems are designed to cause dissolved solids to precipitate out of the water. In the case of an in-home aeration system, the oxidized solids must be filtered from the water. In-home aeration systems tend to be far more expensive than in-well aeration systems and require a relatively large space to accommodate the filtration equipment.

In contrast, with an in-well aeration system oxidized solids tend to settle at the bottom of the well, and subsequent filtration of the water prior to use is generally not required. However, in-well aeration systems typically treat well water continuously, regardless of water usage, as disclosed for example in U.S. Pat. No. 5,080,805 to Houser. In other words, the well water is aerated even after it has been thoroughly stripped of contaminants, which is extremely inefficient and can be detrimental to the compressor supplying the air to the well.

Another problem associated with well water is radon, a naturally occurring, water soluble radioactive gas that results from the breakdown of uranium in soil, rock and water. Radon has been reported to be the second leading cause of lung cancer in the United States. There are two known methods of treating water contaminated by radon gas, namely, aeration and activated carbon filtration. The aeration method involves introducing air into the water supply to increase the gas-liquid interface, thereby allowing the radon gas dissolved in the water to diffuse into the gas phase, as disclosed in U.S. Pat. No. 6,287,369 to Osmond. The air/radon gas mixture is then vented from the water supply and the water is delivered for use. Radon removal systems are typically complex and thus relatively expensive to install and maintain.

Clearly a need exists for an improved in-well aeration system that overcomes the deficiencies of the prior art. More particularly, there is a need in the art for an inexpensive and energy efficient in-well aeration system for removing or otherwise releasing dissolved contaminants from well water.

SUMMARY OF THE INVENTION

The subject invention is directed to a new, cost-effective and energy efficient in-well aeration system and method for removing or otherwise releasing dissolved solids and harmful gases from well water. In accordance with a preferred embodiment of the subject invention, the in-well aeration method includes the steps of positioning an air diffuser within a well casing above the level of the well pump, and subsequently supplying compressed air to the air diffuser to aerate the well water, for a predetermined period of time, upon activation of the well pump. The predetermined period of time is preferably the well recovery period, which is defined as the period of time it takes the well to recover or otherwise completely refill after it has been substantially emptied by the well pump. The method further includes the steps of connecting the air diffuser to an air compressor, connecting the air compressor to an adjustable off-delay timing relay, determining the recovery period for the well, and adjusting the timing relay so that the air compressor supplies air to the diffuser for the well recovery period.

In accordance with a preferred embodiment of the subject invention, the in-well aeration system includes an air diffuser positioned within the well casing above the level of the well pump, and an air compressor disposed at a location remote from the well casing which communicates with the air diffuser by way of a tubular conduit. The system further includes an off-delay timing relay, which is operatively connected to the air compressor for controlling the operating time thereof, and thus the water aeration/treatment period. A pressure switch is operatively connected to the well pump and to the off-delay timing relay. The timing relay activates the compressor when the pressure switch closes to start the well pump. Preferably, the timing relay is adjusted to operate the air compressor for a predetermined period of time, and more preferably, for or through the well recovery period.

The pressure switch and the off-delay timing relay together form a means for operating the air compressor upon activation of the well pump for or through the well recovery period.

The in-well aeration system of the subject invention further includes a filter, which is in communication with the air compressor to remove contaminants from the air entering the compressor, and a desiccant tube, which is in communication with the air compressor to remove moisture from the air entering the compressor. In addition, the system includes a vented well cap, which enables the egress of air and harmful gasses from the well, and a check valve which is associated with the vented cap to prevent the ingress of airborne contaminants into the well.

These and other aspects of the in-well aeration system and method of the subject invention will become more readily apparent to those having ordinary skill in the art from the following detailed description of the invention taken in conjunction with the drawings.

BRIEF DESCRIPTION OF THE DRAWINGS

So that those having ordinary skill in the art to which the present invention pertains will more readily understand how to make and use the in-well aeration system and method of the present invention, embodiments thereof will be described in detail hereinbelow with reference to the drawings, wherein:

FIG. 3 is an enlarged cross-sectional view of the housing that contains, among other things, the air compressor and an off-delay timing relay for controlling the operation of the air compressor that form part of the in-well aeration system depicted in FIG. 1.

DETAILED DESCRIPTION OF PREFERRED EMBODIMENTS

Figure 1:
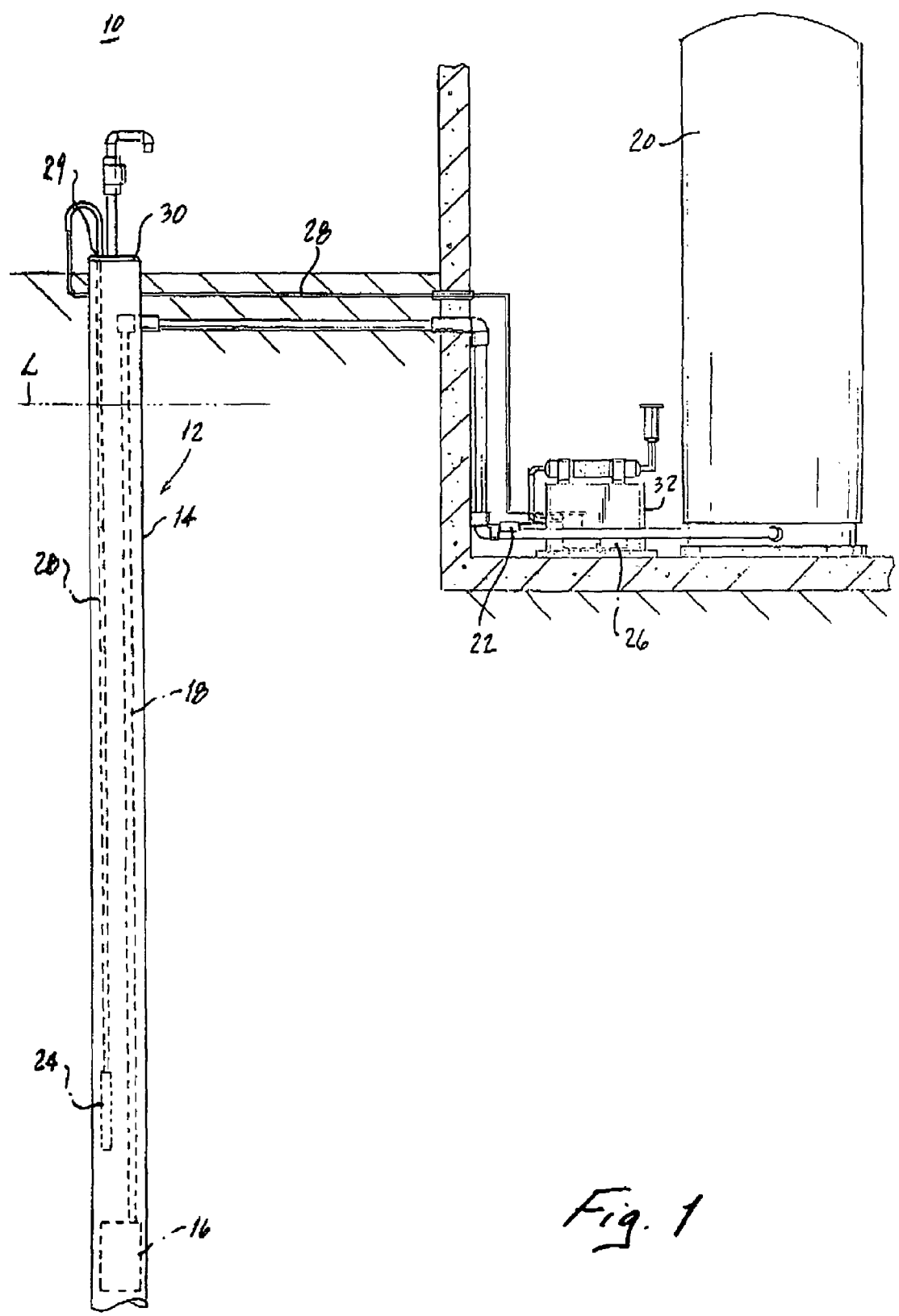
FIG. 1 is a diagrammatic view of the in-well aeration system of the subject invention which includes, among other things, an air diffuser located within the well casing about a foot above the well pump, an air compressor located in a housing remote from the well casing, and a pressure switch for controlling the operation of the well pump.

Referring now to the drawings wherein like reference numerals identify similar aspects and/or features of the subject invention, there is illustrated in FIG. 1 a novel system for aerating well water, which is constructed in accordance with a preferred embodiment of the subject invention and designated generally by reference numeral 10. The aeration system 10 of the subject invention is designed to remove dissolved solids such as iron, manganese or sulfur from the well water column, as well as harmful gases, such as radon, by effectively aerating the water prior to pumping it from the well. The dissolved solids are oxidized and caused to precipitate out of the water column to the bottom of the well, while radon is released from the water column and vented from the well through a novel well cap described in greater detail below. The aeration system 10 of the subject invention may be installed as original equipment in a new well, or it may be installed in an existing well.

Referring to FIG. 1, the aeration system 10 of the subject invention is preferably associated with a residential well 12 that includes a well casing 14. Well casings for residential use range in depth. Wells may be drilled as shallow as 30 feet or as deep as 200 feet, or more in some instances. Casings for residential wells generally have a diameter of either 4 inches or 6 inches. However, wells that are dug rather than drilled may have a diameter in the 2 to 4 foot range and a depth ranging from about 10 feet to 50 feet, or more.

A well pump 16 is positioned within the well casing 14 at a sufficient depth below the water level "L". A supply conduit 18 extends from the well pump 16, through the well casing 14 at a location above the water line "L", and into the residence to deliver water to a pressurized storage tank 20. A pressure switch 22 is operatively associated with the supply conduit 18 for controlling the operation of the well pump 16. The pressure switch 22 is adapted to close, and thus activate the well pump 16, when it senses a drop in water pressure below a predetermined level within the storage tank 20. The pressure switch 22 is adapted to open, and thus turn off the well pump 16, when it senses that the water pressure within the storage tank 20 is normalized. Those skilled in the art will readily appreciate that, when the pump 16 is shut off, the well may or may not be empty. Indeed, in many instances, the pressure switch 22 will shut the pump 16 off before the well has been emptied.

Figure 2:
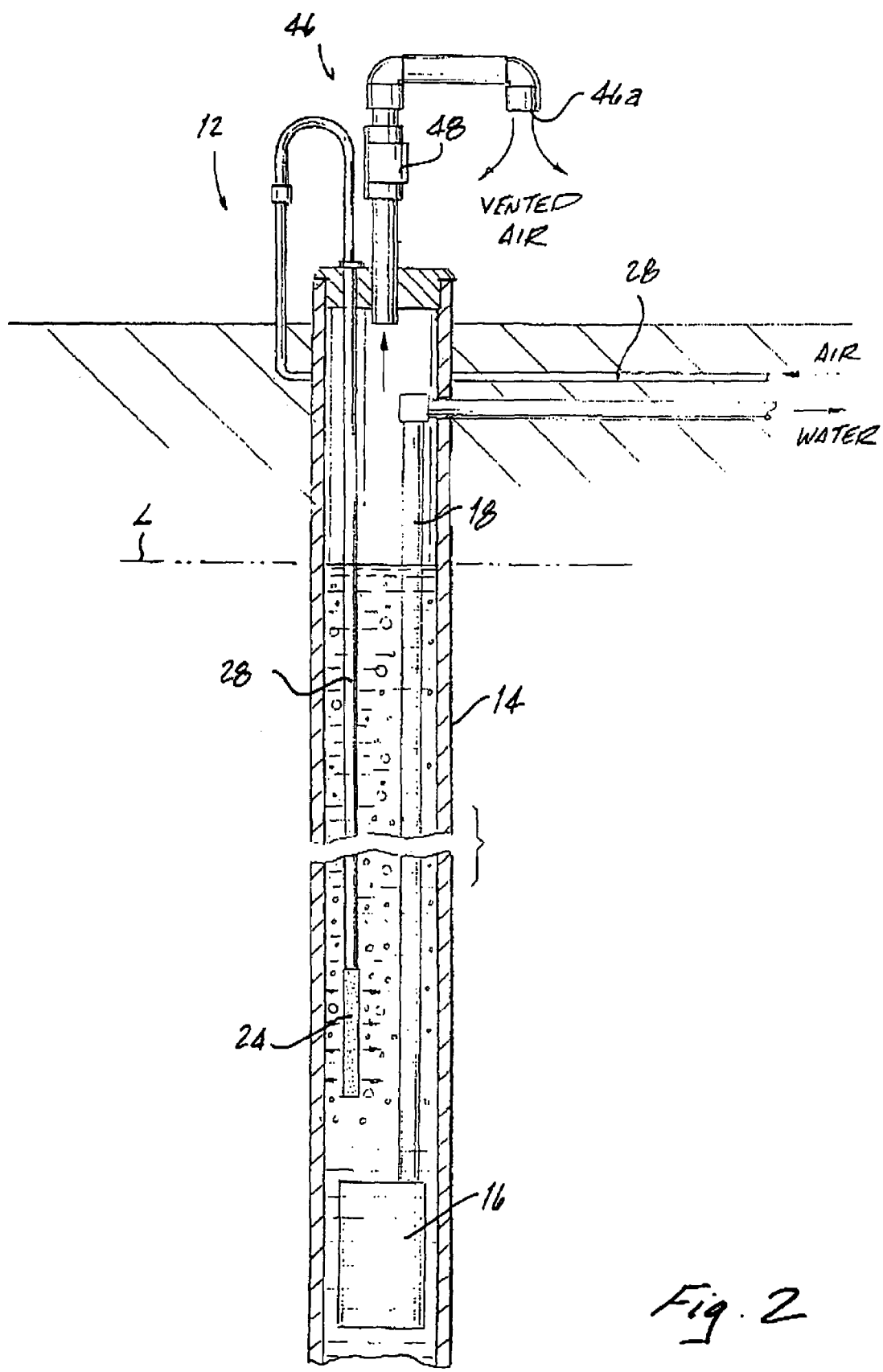
FIG. 2 is an enlarged cross-sectional view of the well casing which contains, among other things, the air diffuser and vented well cap that form part of the in-well aeration system depicted in FIG. 1.

Referring to FIG. 2, an air diffuser 24 is disposed within the well casing 14 for admitting compressed air into the well casing to facilitate the ready removal of radon gas by diffusion and the precipitation of dissolved solids by oxidation. Preferably, the air diffuser 24 is positioned about one foot above the top of the well pump 16. Those skilled in the art will readily appreciate that the type of air diffuser 24 utilized with the aeration system 10 can vary. For example, the air diffuser may be formed from a porous fabric, or from porous stone, as is well known in the art. Other types of air diffusers may also be employed so long as they are suitable for long-term use under water.

The air diffuser 24 communicates with an air compressor 26 by way of an air supply hose 28. The air compressor 26 is preferably located remote from the well casing 14, and more preferably, it is located within the residence, adjacent to the storage tank 20. Supply hose 28 extends from the compressor 26, through a sealed aperture 29 formed in vented well cap 30, and into the well casing 14. In the well casing, the supply hose 28 extends down to the air diffuser 24 located about a foot above the well pump 16. Preferably, the air compressor 26 is suitable for residential use and is of relatively small horsepower. However, the air compressor must have a sufficient output capacity to achieve optimum aeration at the level of the air diffuser 24. Therefore, a compressor with a relatively high pressure output would be selected for relatively deep wells, while a compressor with a relatively low pressure output would be selected for relatively shallow wells. By way of example, in a well wherein the air diffuser is positioned at a depth of about 200 feet, a 100 psi air compressor running at about between $\frac{1}{6}^{th}$ to $\frac{1}{10}^{th}$ horsepower would be sufficient to achieve optimum aeration of the well water.

Referring to FIG. 3, the air compressor 26 is preferably housed within a hardened enclosure 32. The enclosure 32 is preferably mounted or otherwise installed proximate to the pressure switch 22 associated with the storage tank 20. The enclosure 32 also houses an off-delay timing relay 34, which is electrically connected to the air compressor 26 and to the pressure switch 22 by conventional wiring.

The timing relay 34 is energized when the pressure switch 22 closes to turn on the well pump 16. At such a time, the timing relay 34 activates the air compressor 26, which begins to supply compressed air to the diffuser 24 to treat/aerate the well water. The timing relay 34 is adapted and configured to turn the air compressor 26 off after a predetermined time period, regardless of the volume of water in the well. More particularly, during system installation the timing relay 34 is set or otherwise adjusted to operate the air compressor 26 for the well recovery period, after which time the compressor is shut off. This ensures system efficiency and preserves the life of the compressor. Moreover, it guarantees that the entire water column above the well pump 16 will be sufficiently aerated before the pump 16 starts again, regardless of whether the well had been previously emptied by the pump. Allen-Bradley, a division of Rockwell Automation manufactures and sells a suitable off-delay timing relay identified by Catalog No. 700FSB4UU23, which has a factory preset timing period, that may be reduced incrementally. Thus, the timing relay 34 of the subject invention can be advantageously adjusted during system installation to accommodate different well capacities and recovery rates, or otherwise, wells having differing recovery periods.

Those skilled in the art will readily appreciate that the recovery period of a well is dependant upon the volume of well water located above the well pump and the recovery rate of the well, which is typically a known constant for a given geographical location. The recovery period for a well may be calculated therefore, using the following equation:

$$T = V/k$$

Where: T is the well recovery period;
  V is the volume of water above the well pump; and
  k is the rate of recovery for the well.

The volume of water in the well may be determined using the following formula:

$$V = v(D_p - L)$$

Where: v is the volume of water per foot of well casing;
$D_p$ is the depth of the pump in the well casing; and
L is the water level relative to the top of the well casing.

Therefore, the well recovery period may be determined using the following expression:

$$T = v(D_p - L)/k$$

For example, in a well casing having a diameter of 6 inches, which is known to contain 1.5 gallons of water per foot, wherein the well pump is positioned at a depth of 180 feet ($D_p$=180) and the water level is 30 feet below the top of the well casing (L=30), the volume of water above the well pump is 225 gallons (i.e., 150 feet of water at 1.5 gallons per foot). Where the recovery rate "k" for the well is known to be about 5 gallons per minute (gpm), the recovery period "T" of the well will be about 45 minutes, which is 225 gallons of water recovered at 5 gpm.

Using this result, the off-delay timing relay 34 of aeration system 10 can be readily adjusted to turn the air compressor 26 off after a period of time that is about equal to the well recovery period or about 45 minutes. To maximize the aeration effects on the water column above the well pump, the aeration period could be extended through the well recovery period for an additional period of about between 10–15 minutes. Accordingly, the off-delay timing relay 34 could be adjusted to about 1 hour, to maximize contaminant reduction and/or removal.

With continuing reference to FIG. 3, enclosure 32 also houses a solenoid valve 36 which is adapted and configured to relieve the line pressure on the discharge side of the air compressor 26. The solenoid valve 36 is operatively connected to the delay relay 34 and pressure switch 22 by conventional wiring. Alternative mechanisms may be utilized to relieve line pressure. Mounted on the exterior of the enclosure 32 is a desiccant tube 38, which contains ActAlum® and/or SilicaGel® or a similar material for removing moisture from the air entering the compressor 26. This will prevent moisture from accumulating and possibly freezing in the winter within the air hoses that communicate with the compressor. The desiccant tube 38 communicates with the air compressor 26 through a feed conduit 40.

The desiccant tube 38 also communicates with an air filter 42 by way of an air hose 44 to remove contaminants from the air entering the compressor 26. A suitable filter has a removal rating of 50 Microns, and may contain, for example, pleated media. If air is drawn into filter 42 from an exterior location, the filter should be positioned to prevent rain or debris from entering the inlet port of the filter housing.

As best seen in FIG. 2, the well cap 30 of the subject invention includes a ventilation tube 46. Ventilation tube 46 permits the egress of air and/or radon gas from the well 12 during a treatment period. The outlet port 46a of ventilation tube 46 is directed downwardly toward the well cap 30 to prevent the entry of water and debris. A conventional one-way check valve 48 is operatively associated with ventilation tube 46 to prevent the ingress of contaminants into the well 12, while permitting the egress of air and/or radon therefrom. For example, a flapper valve may be utilized for this purpose. Well cap 30 may be easily used as a replacement for an existing well cap, when aeration system 10 is installed in an existing well.

Although the system and method of the subject invention have been described with respect to preferred embodiments, those skilled in the art will readily appreciate that changes and modifications may be made thereto without departing from the spirit and scope of the subject invention as defined by the appended claims.

What is claimed is:

1. A method of aerating water in a well having a well pump positioned therein, comprising the steps of:
    a) positioning an air diffuser within the well above level of the well pump;
    b) operatively connecting the air diffuser to an air compressor;
    c) operatively connecting the air compressor to an adjustable off-delay timing relay;
    d) determining a well recovery period for the well; and
    e) supplying compressed air to the diffuser to aerate the well water upon activation of the well pump and through the well recovery period.

2. A method according to claim 1, further comprising the step of filtering the air entering the air compressor.

3. A method according to claim 1, further comprising the step of passing the air entering the air compressor through a desiccant tube.

4. A method according to claim 1, further comprising the step of venting the well through a vented well cap.

5. A method according to claim 1, wherein the step of positioning an air diffuser within the well above the level of the well pump involves positioning the air diffuser about one foot above the level of the well pump.

6. A system for aerating water in a well having a well pump positioned therein, comprising:
    a) a well having a well recovery period;
    b) an air diffuser positioned within the well above the level of the well pump to aerate the well water;
    c) an air compressor in communication with the air diffuser for supplying compressed air thereto; and
    d) means for operating the air compressor upon activation of the well pump and through the well recovery period.

7. A system as recited in claim 6, wherein the means for operating the air compressor is an adjustable off-delay timing relay.

8. A system as recited in claim 7, wherein the off-delay timing relay is adjusted to operate the air compressor through the well recovery period.

9. A system as recited in claim 6, further comprising means for filtering the air entering the compressor.

10. A system as recited in claim 6, further comprising means for withdrawing moisture from the air entering the compressor.

11. A system as recited in claim 6, wherein the well has a vented cap for permitting the egress of air and airborne contaminants from the well.

12. A system as recited in claim 11, wherein a check valve is operatively associated with the vented cap to prevent the ingress of contaminants into the well.

13. A system as recited in claim 6, further comprising means for relieving line pressure on a discharge side of the air compressor.

14. A system for aerating water in a well having a well pump positioned therein, the system comprising:
    a) a well having a well recovery period;
    b) an air diffuser positioned within the well above the level of the well pump to aerate the well water;
    c) an air compressor disposed remote from the well and communicating with the air diffuser to supply compressed air thereto;

d) an off-delay timing relay operatively connected to the air compressor for controlling the operating time thereof; and e) a pressure switch operatively connected to the well pump and the off-delay timing relay, wherein the off-delay timing relay activates the air compressor when the pressure switch closes to start the well pump and the compressor continues to operate for or through the well recovery period.

15. A system as recited in claim 14, further comprising a filter in communication with the air compressor for removing contaminants from the air entering the compressor.

16. A system as recited in claim 14, further comprising a desiccant tube in communication with the air compressor for removing moisture from the air entering the compressor.

17. A system as recited in claim 14, further comprising a vented well cap for enabling the egress of air from the well.

18. A system as recited in claim 14, wherein a check valve is associated with the vented cap to prevent the ingress of contaminants into the well.

19. A system as recited in claim 14, further comprising means for relieving line pressure on a discharge side of the air compressor.

20. A method of aerating water in a well having a well pump positioned therein, comprising the steps of:

a) positioning an air diffuser within the well above a level of the well pump;

b) operatively connecting the air diffuser to a source of compressed air;

c) operatively connecting the source of compressed air to an adjustable off-delay timing relay;

d) determining a well recovery period for the well; and e) supplying a flow of compressed air to the diffuser to aerate the well water upon activation of the well pump;

f) suspending the flow of compressed air to the diffuser at or through the end of the well recovery period.

* * * * *